United States Patent [19]

Baillie

[11] Patent Number: 5,067,252
[45] Date of Patent: Nov. 26, 1991

[54] METHOD AND APPARATUS TO CONDUCT FLUIDIZATION OF COHESIVE SOLIDS BY PULSATING VAPOR FLOW

[75] Inventor: Lloyd A. Baillie, Plano, Tex.

[73] Assignee: Atlantic Richfield Company, Los Angeles, Calif.

[21] Appl. No.: 518,376

[22] Filed: May 3, 1990

Related U.S. Application Data

[62] Division of Ser. No. 330,330, Mar. 29, 1989, Pat. No. 4,939,850.

[51] Int. Cl.$^5$ ............................................. F26B 17/00
[52] U.S. Cl. .................................... 34/57 A; 34/57 R; 34/10
[58] Field of Search ......................... 34/57 A, 57 R, 10

[56] References Cited

U.S. PATENT DOCUMENTS

| | | | |
|---|---|---|---|
| 2,856,273 | 10/1958 | Beber et al. | 34/57 A |
| 3,733,713 | 5/1973 | Williamson, Jr. | 34/57 A |
| 4,130,071 | 12/1978 | Porter | 34/57 A |

Primary Examiner—Albert J. Makay
Assistant Examiner—John Sollecito
Attorney, Agent, or Firm—Tom F. Pruitt

[57] ABSTRACT

Cohesive solids are fluidized in a chamber having a movable perforated wall through which the fluidizing gas flows by reciprocating the movable wall.

5 Claims, 3 Drawing Sheets

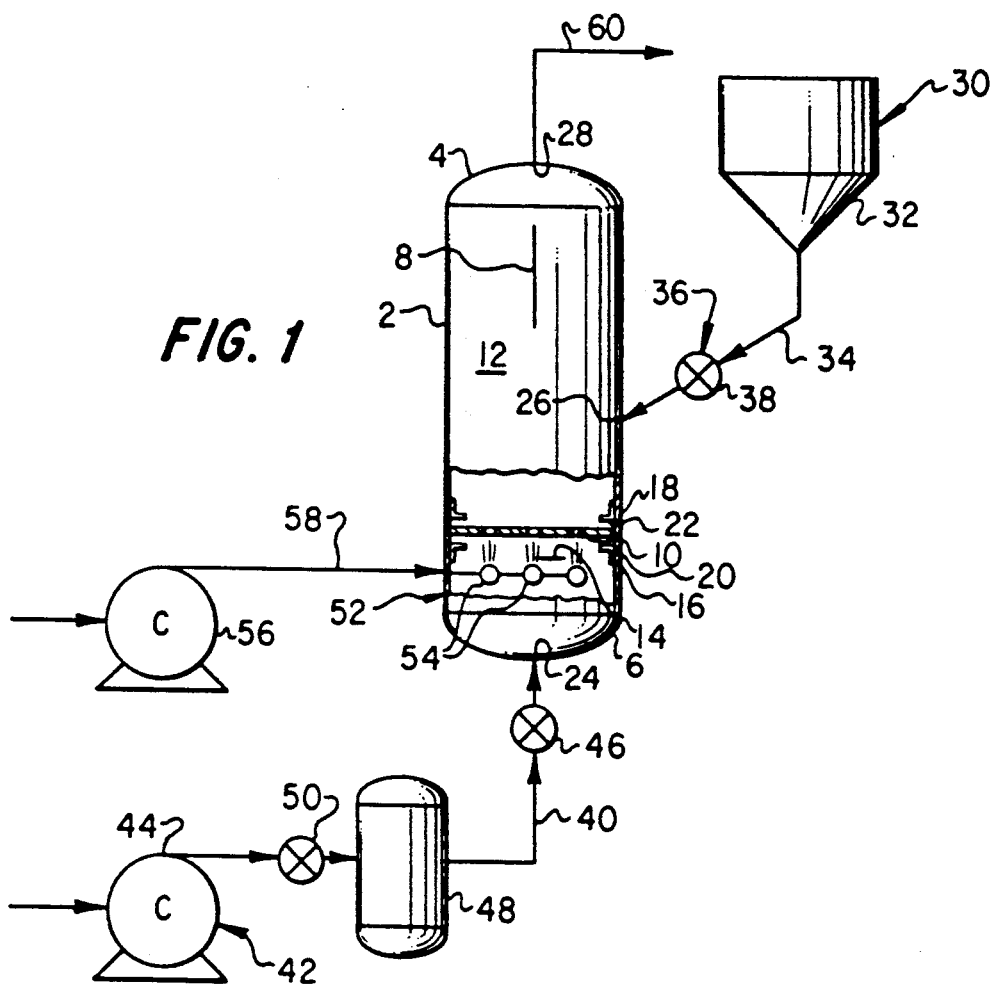
FIG. 1
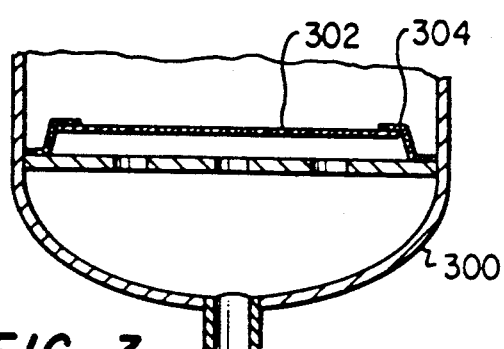
FIG. 2
FIG. 3
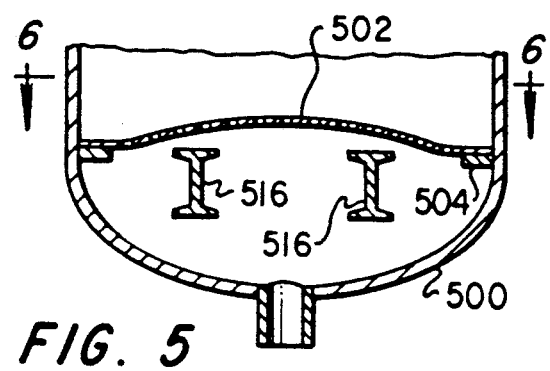
FIG. 4
FIG. 5

METHOD AND APPARATUS TO CONDUCT FLUIDIZATION OF COHESIVE SOLIDS BY PULSATING VAPOR FLOW

This is a division of application Ser. No. 07/330,330, filed Mar. 29, 1989, now U.S. Pat. No. 4,939,850.

BACKGROUND OF THE INVENTION

Fluidization of finely divided solids forms the basis of many important industrial processes, the best known of which is fluid catalytic cracking. Fluidization seems to work best for solids in a particle size range from roughly 5 to 500 microns. There are, however, solids which lie within this particle size range which stick or cling together and cannot be reliably fluidized. These solids display a property known as cohesiveness. Neat cement is an example of such a material, although there are many other cohesive powders, such as grain dust, finely divided plastics, and more.

Fluidization of finely divided solids depends on the formation of gas bubbles which pass freely upwardly through a dense phase of particles totally supported by up-flowing vapor. Cohesive solids tend to form into masses which are bypassed by the vapor flow through cracks or fissures, rather than through bubbles. These fissures tend to become long-lived, so that the cohesive masses which develop are not subject to mixing. In many cases (for example, with neat cement), the solids fluidize very well for a short time after they are subjected to mechanical stirring. Once the cohesive masses form, however, it may be impossible to break them up by gas flow alone.

A well fluidized vessel can be used for blending solids which would otherwise need to be accomplished by repeated transfers of the solids from one vessel to another. Also, it is much easier to obtain a steady, controllable flow of solids from a fluidized vessel than from a nonfluidized vessel. Clearly, method and apparatus for fluidizing cohesive solids would be very desirable.

STATEMENT OF THE INVENTION

According to one embodiment of the invention, there is provided an apparatus for fluidizing cohesive solids which comprises a vessel having an upper end and a lower end. A gas permeable partition is positioned in the vessel between the upper end and the lower end. The partition divides the inside of the vessel into a first chamber and a second chamber. At least a portion of the gas permeable partition is movable along an axis drawn normal to the partition from a first longitudinal position to a second longitudinal position. The vessel has an inlet in the first chamber for the introduction of gas, an inlet in the second chamber for the introduction of finely divided solids, and an outlet in the second chamber for exhausting a fluidized mixture of finely divided solids and gas which has entered the second chamber through the partition.

In use, a flow of gas sufficient to fluidize the solids in the second chamber is introduced into the first chamber. The gas flows through the partition and fluidizes the solids. The partition is moved back and forth between the first position and the second position to break apart or prevent the formation of cohesive masses in the second chamber.

In a preferred embodiment of the invention, the gas is introduced into the first chamber at a first flow rate sufficient to move the partition from the first position to the second position. The flow rate is reduced to a second flow rate to permit return of the partition to the first position by gravity or other biasing means. By pulsing the gas into the first chamber at the first flow rate from time to time, the partition can be moved with sufficient frequency to assure reliable fluidization of cohesive powders in the second chamber.

Bins with "live bottoms" have been used in the prior art to handle certain kinds of solids. By "live bottom" is meant a bin-bottom which can be mechanically vibrated or moved. The inventive device uses a live bottom which is also a gas distribution grid. The movable gas distribution grid (for example, a perforated plate or a fabric pad, or a combination of both) when the invention is used can easily be made to move up and down by a pulsating source of fluidizing gas. Cohesive masses which come in contact with this grid are subjected to mechanical forces which tend to break them up. In addition, the entire bed alternately expands and shrinks as the gas flow rises and falls, which provides another source of mechanical energy to break apart or prevent the cohesive masses.

BRIEF DESCRIPTION OF THE DRAWINGS

FIG. 1 schematically illustrates a fluidization system employing certain features of the present invention.

FIGS. 2 through 5 schematically illustrate variations on a portion of the device shown in FIG. 1.

DETAILED DESCRIPTION OF THE INVENTION

Figure 6:
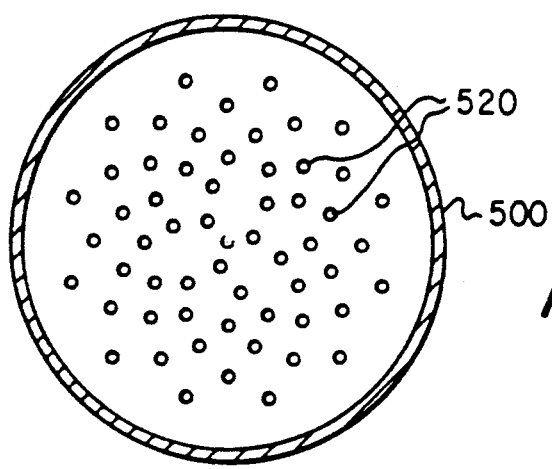
FIG. 6 is a cross sectional view of a portion of the device shown in FIG. 5 as would appear when viewed along the indicated lines.

In one embodiment of the invention, a vessel 2 is provided which has an upper end 4, a lower end 6 and a longitudinal axis which extends along the line indicated by numeral 8 between the upper end and the lower end. At least one gas permeable partition 10 is positioned in the vessel 2 between the upper end 4 and the lower end 6 and divides the vessel 2 into a first, here lower, chamber 14 and a second, here upper, chamber 12. The partition 10 is movable from a first position 16 to a second position 18 along a line drawn normal to the partition, in this case coinciding with the longitudinal axis of the vessel. An annular bracket 20 is mounted to an inside surface of the vessel 2 in the illustrated embodiment to define the first position 16 upon which the partition rests. An annular bracket 22 is positioned on an inside surface of the vessel 2 to form a stop and define the second position 18 to limit movement of the partition 10 in the upper direction. The vessel 2 has at least one inlet 24 in the lower chamber 14 for the introduction of a fluid, preferably a gas. The upper chamber 12 has at least one inlet 26 for the introduction of finely divided solids and at least one outlet 28 for exhausting a mixture of the fluid introduced via inlet 24 and the finely divided solids introduced via inlet 26.

In a preferred embodiment of the invention, the inlet 26 is connected to a source 30 of the particulate material desired to be fluidized. In the illustrated embodiment of the invention, the source 30 is formed by a bin 32 which is connected to the inlet 26 by a line 34. A feeder 36 such as star valve 38 is positioned in the line 34 to feed particulate material from the source 30 into the chamber 12 at a desired rate.

A line 40 connects the inlet 24 in the lower chamber 14 with a source 42 of fluid, preferably gas, at elevated pressure. Compressor 44 provides the source 42 in the illustrated embodiment of the invention. The line 40 preferably contains a valve 46 positioned between the compressor 44 and the inlet 24. By opening and closing the valve 46, the flow of gas from compressor 44 into the chamber 14 can be controlled as desired. A surge tank 48 is preferably positioned between the valve 46 and the compressor 44 in the illustrated embodiment. A valve 50, preferably a check valve, is positioned between the surge tank 48 and the compressor 44.

In one embodiment of the invention, the chamber 14 is provided with a means 52 for providing a continuous flow of fluid thereinto. In the illustrated embodiment, the means 52 is formed by manifolds 54 in the lower chamber 14 having fluid outlets establishing pathways from inside the manifolds to outside the manifolds and a compressor 56 connected to the inside of manifolds 54 by a line 58 to provide for the continuous gas flow. If desired, a check valve (not shown) can be positioned in the line 58 between the compressor 56 and the manifolds 54 to assist in pressurizing the lower chamber in the hereinafter described manner. The flow from compressor 56 is preferably sufficient to fluidize the solid particles introduced into the upper chamber 12 from bin 32, but not so great as to cause the partition 10 to be positioned in the second position. In operation, gas flow from compressor 56 fluidizes the solids while gas flow from compressor 44 is released from time to time from the surge tank (accumulator) 48 by the actuation of valve 46. Preferably, the valve 46 is of the fast acting type so that the surge tank 48 can be emptied over a period of time on the order of one second or less. The additional gas flow from the compressor 44 is sufficient to momentarily urge the partition 10 into the second position 18 and break up any cohesive masses which may be forming in the second chamber 12. A mixture of gas from the compressors 44 and 56 and particles from the bin 32 is withdrawn from the upper chamber 12 through outlet 28 and conveyed to further processing by line 60.

A valve 46 which can be used with good results is constructed as follows: The valve body is formed from a 3 inch pipe nipple having end caps. A one inch port empties into the nipple from a surge tank through one end cap; a valve stem having a rubber plug on the end to seal the one inch port enters the nipple through the other end cap. The outer end of the valve stem is spring biased toward the one inch port. A pair of opposed one inch exhaust posts open through the side wall of the pipe nipple. A disk having a diameter of nearly three inches is adjustably mounted on the stem between the opposed exhaust ports and the rubber plug when the plug seals the ports. When pressure in the surge tank dislodges the plug, the high pressure acting on the disk throws the valve into the wide open position, the disk being moved into a longitudinal position between the opposed exhaust ports and the end cap containing the valve stem, until the pressure acting on the disk drops sufficiently to permit the rubber plug to reseal the port by action of the biasing means. The cycle rate can vary as desired, for example, in the range of 0.1 to 10 seconds.

Figure 7:
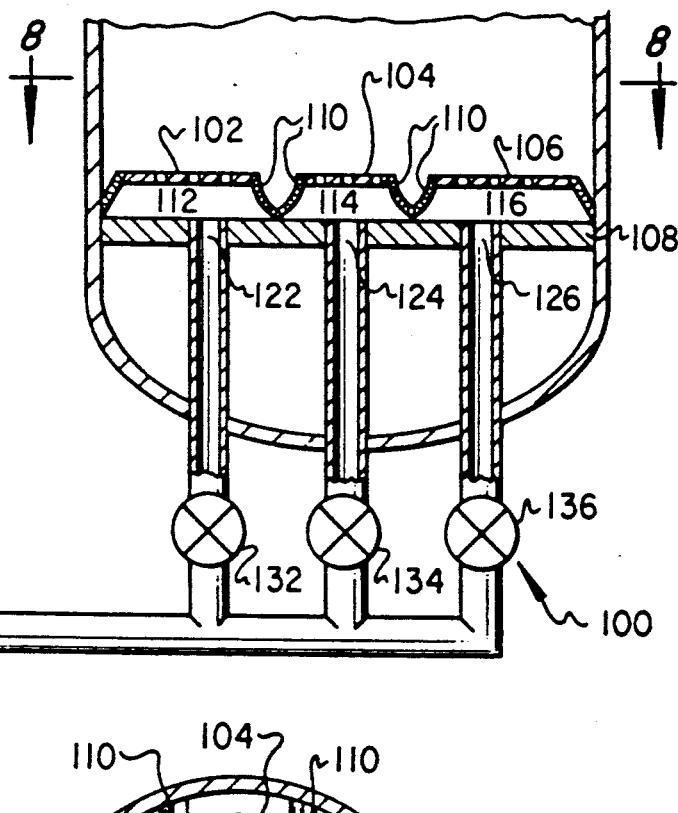
FIG. 7 schematically illustrates another embodiment of the invention where a plurality of perforated partitions are positioned in the same vessel.
Figure 8:
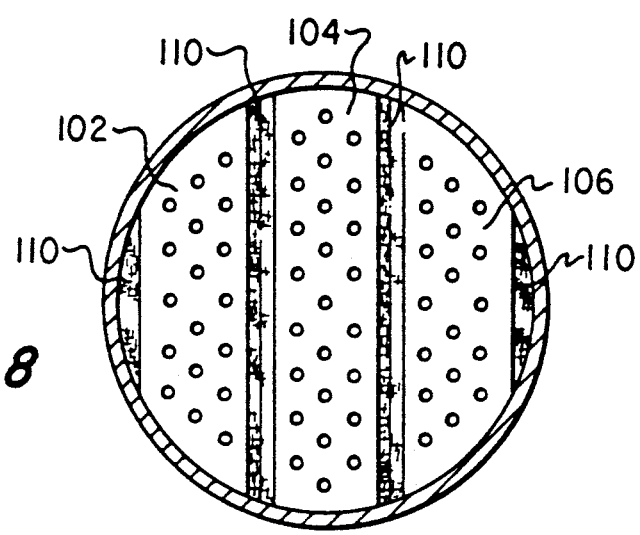
FIG. 8 is a cross sectional view of a portion of the device as shown in FIG. 7 as would appear when viewed along the indicated lines.

There are a number of valving arrangements which can be used to convert a continuous source of fluidizing gas to a pulsating source. These can be considered in two groups: (1) flow interrupting devices which do store employing surge tank 48, and (2) flow interrupting devices which do not store compressed gas as illustrated in FIGS. 7 and 8 for example. The former technique offers the most effective mechanical action, since the abrupt release of compressed gas can result in violent mixing. However, the second method as illustrated in FIGS. 7 and 8 does not require a source of high pressure gas and may offer sufficient mechanical action for some applications.

In FIG. 7, a manifold 100 delivers fluidizing gas beneath a number of separate bin bottom members or grids 102, 104 and 106. Each of the grids comprises a perforated plate or sheet operatively connected to a restraining member 108 such as by cloth strips 110. Chambers are formed between the plates and the support member 108 as illustrated by numerals 112, 114 and 116 beneath plates 102, 104 and 106 respectively. The chambers have fluid inlets 122, 124 and 126 respectively which are connected to a source 130 of compressed gas such as by the manifold arrangement 100. Valve 132 is positioned between the inlet 122 and the source 130. Valve 134 is positioned between the inlet 124 and the source 130. Valve 136 is positioned between the inlet 126 and the source 130. Flow of gas to each of the chambers 112, 114 and 116 is controlled by the valves 132, 134 and 136 which are in the normally closed positioned. Flow controlling valves 132, 134 and 136 could be pneumatically actuated ball valves, for example. The total vapor flow, which would ordinarily be delivered to all grids at once, is delivered to one grid at a time in a preferred embodiment of the invention. The superficial gas velocity through the grid is sufficient to lift the grid off of the support 108. When the flow is interrupted, the receiving grid 102, 104 and 106 falls back to the support 108 and another grid is picked up by the vapor flow.

The system illustrated by FIGS. 7 and 8 is best applicable to solids that are not extremely difficult to fluidize and can be carried out without a source of high pressure gas. The system illustrated in FIG. 1, however, is preferred for difficult to fluidize solids because the sudden release of pressure mechanically shocks the bed of solids to an extent determined by the amount of pressure used.

FIGS. 2 through 5 show variations of the plate 10 of FIG. 1 which can be used in accordance with the invention.

In FIG. 2, a vessel 200 is provided with a perforated plate 202 circumferentially connected by a fabric 204 to an inside circumference of the vessel 200. The largest dimension of the plate 202 is small compared with the diameter of the vessel where the plate is positioned, such as in range of from 10% to 50% of the diameter of the vessel.

In FIG. 3, a plate 302 is connected to the inside wall of a vessel 300 by fabric 304. The arrangement in FIG. 3 is similar to that shown in FIG. 2 except that the plate 302 is larger, on the order of 75% to 95% of the diameter of the vessel. The fabric which circumferentially connects the plate with the interior of the vessel can be lighter in weight than the fabric used in the device of FIG. 2 since the structural requirements are less.

FIG. 4 shows an embodiment of the invention which can be used in high temperature applications although it is not limited to such uses. A plate 402 rests on an inside flange 406 which extends circumferentially around an inside surface 410 of a vessel 400. A rim 412 extends axially from an outside circumference of the plate 402 in a direction away from flange 406. The rim 412 is received by an annularly shaped baffle 414 mounted circumferentially around the inside surface 410 of the vessel 400. The baffle 414 defines the second position for the perforated plate 402 and prevents excessive fluid channeling around the circumference of the baffle. Support members such as I beams 416 can be provided crossing an inside surface of the vessel 400 if structurally required.

In FIG. 5, a perforated flexible metal sheet 502 forms a partition across an inside surface of a vessel 500. The metal sheet 502 is fixedly attached to the inner surface such as by welding to an annular flange 504. In the first or lower position (not shown), the flexible sheet 502 can rest against suitable support members such as I beams 516.

With reference to FIG. 6, apertures 520 through the partition will generally be quite small, since the particles to be fluidized generally range in size from 5 to about 500 microns, frequently between 20 and 200 microns. Those skilled in the art can readily calculate the gas velocity required to prevent particle migration downwardly through the apertures and gas velocity across the cross section of the second chamber in order that the particles stay fluidized. Generally speaking, the total area of the apertures 520 will be less than 20% of the cross sectional area of the vessel. The distance between the first position for the partition and the second position for the partition can vary over a wide range. Generally, based on vessel diameter, the positions will be separated by from about 2% to about 50% of the vessel diameter, usually from about 5% to about 25% of a vessel diameter. The thickness of the flexible metal sheet will vary depending upon vessel diameter. Generally however, the sheet will have a thickness in the range of from about ten thousandths to one hundred thousandths of an inch.

Figure 9:
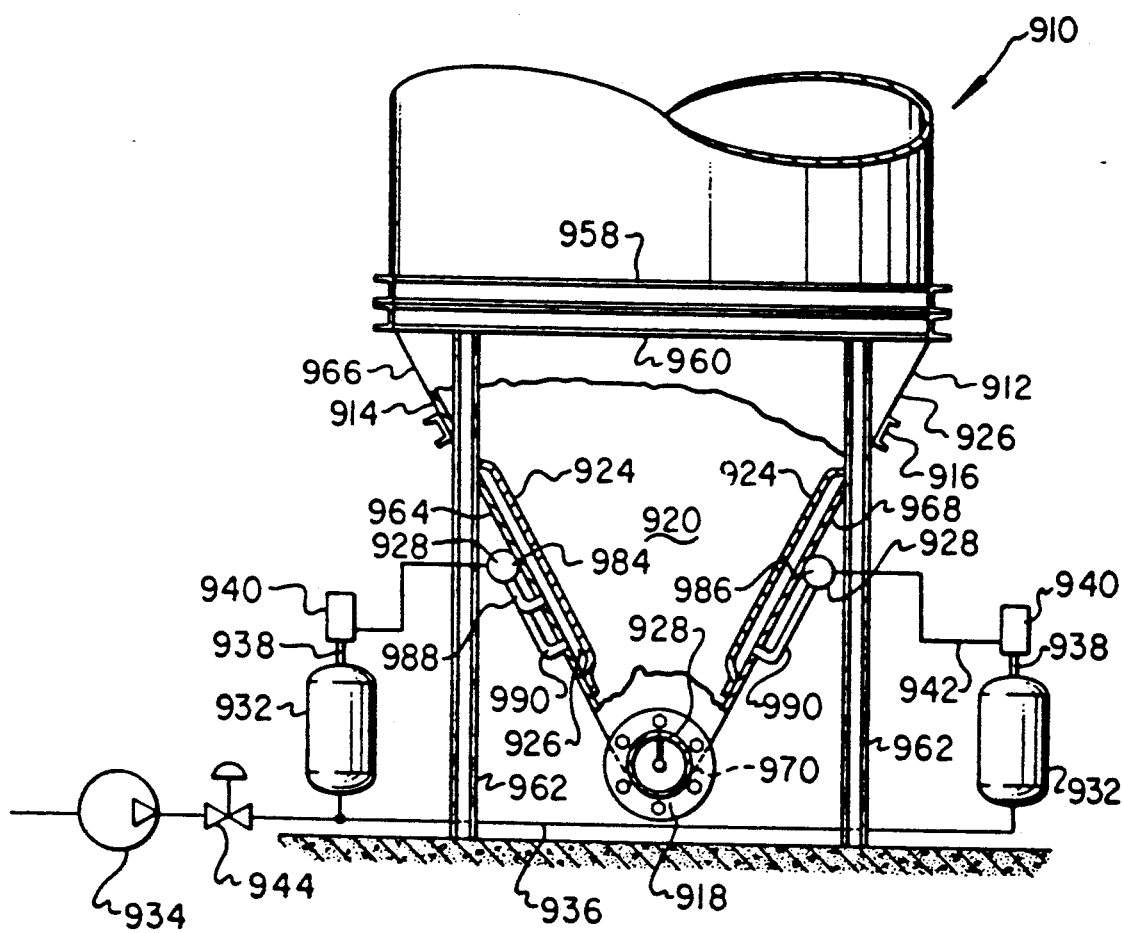
FIG. 9 is a side elevation, partially sectioned, of a flat-side storage bin constructed in accordance with one embodiment of the invention.

Referring to FIG. 9, there is shown a partial side elevation of a dry particulate material bulk storage bin having parts of the housing broken away, generally designated by the numeral 910. The bin 910 is particularly adapted for storing particulate flowable materials such as dry cement, flour and other relatively fine powdered materials. The bin 910 includes a depending portion 912 having sloping flat sidewalls 914 and 916 which converge toward an outlet trough portion 918. The trough portion 918 may include an auger or screw type conveyor disposed therein for displacing material from the bin. An interior chamber 920 formed within the bin 910 is delimited in part by the sidewalls 914 and 916 and these walls are each fitted with at least one fluidizing pad generally designated by the numeral 924. Each of the pads 924 is preferably constructed of a somewhat porous canvas like material and is suitably secured to the interior surface of the walls 914 and 916, respectively, around its perimeter. The pads 924 are responsive to the injection of pressure air into a narrow space 926 formed between each pad and the interior wall surface of the walls 914 and 916 to flex the pad and to disseminate pressure air into the chamber 920 to assist in fluidizing or causing the material stored therein to flow when such action is wanted. The operation of the pads 924 is enhanced by the injection of a relatively high pressure pulse or blast of pressure air into the spaces 926 by way of respective conduits or manifolds 928 disposed on the exterior surfaces of the walls 924 and 926, respectively. The manifolds 28 are adapted to include one or more pressure air discharge pipes connected thereto and suitably connected to the walls 914 and 916 for discharging pressure air through suitable openings in the walls into the spaces 926.

Pressure air is supplied for operating the fluidizing pads 924 by way of respective sources including reservoir tanks 932 which may receive pressure air from a common source such as a compressor 934 by way of a suitable supply conduit 936. The tanks 932 each are connected to an inlet conduit 938 of a self controlling air blast or pulse type control valve 940. The control valves 940 are each connected to a manifold 928 by way of a suitable conduit 942. In one mode of operation of fluidizing material in the chamber 920 repeated pulses or blasts of pressure air are emitted into the chambers 926 by way of the reservoir tanks 932 and the valves 940. A control valve 944 may be suitable remotely controlled to provide pressure air to the tanks 932. With the supply of pressure air to the tanks 932 the pressure in each tank increases until the respective control valves 940 self actuate to deliver a pulse or blast of pressure air through the respective manifolds 928 into the spaces 926. By providing the bin 910 with a plurality of self actuating valves 940 feeding from a common source, sufficient fluidizing action can be obtained without an elaborate control system.

In each of the described embodiments there exists the possibility of particles going into the first chamber, by going either around or through the partition. Where this problem is presented, a particle-receiving boot can be provided in the first chamber, with a port for removing the accumulated particles. If desired, the particles removal port can be connected with a riser for automatic return of the particles to the second chamber.

A properly designed gas distribution grid offers sufficient flow resistance so that the gas will flow evenly through all parts of the grid. The movable grids need to have a flow resistance such that the highest gas flow will create a back pressure under the grid sufficient to lift the grid along with a layer of unfluidized solids which may be resting on it. Canvas pads are already commonly used as grids in cement bins, although not with pulsating gas flow. These could be converted into pulsating grids by the addition of flow interruption apparatus in the source of fluidizing air. The addition of a perforated plate under the fabric pad offers the advantage of stiffening the pad particularly at the spot directly opposite to the gas inlet, and also enables the designer to tailor the flow resistance to the expected gas flow. Glass cloth or wire reinforced gas cloth may be substituted for canvas for greater strength.

While various preferred embodiments of the invention have been shown and described herein, the invention herein is not to be so limited, except to the extent such limitations are found in the claims.

What is claimed is:

1. Apparatus comprising:
   a vessel having an upper end and a lower end; and
   a gas permeable partition positioned in the vessel between the upper end and the lower end, said partition dividing the vessel into a first chamber and a second chamber, at least a portion of the gas permeable partition being movable along an axis drawn normal to the plane of the partition between a first longitudinal position and a second longitudinal position, said vessel having an inlet in the first chamber for the introduction of a fluid, an inlet in the second chamber for the introduction of a finely divided solid, and an outlet in the second chamber for exhausting a mixture of the fluid and the finely divided solid from the second chamber; and a pulsating source of fluidizing gas to said first chamber.

2. Apparatus in claim 1 wherein said pulsating source of fluidizing gas comprises a gas compressor and a flow interrupting device operably connected to the inlet in the first chamber.

3. Apparatus as in claim 2 wherein said gas permeable partition comprises a perforated metal plate.

4. Apparatus as in claim 2 wherein said gas-permeable partition comprises a fabric connector connecting said gas permeable partition to said vessel.

5. Apparatus as in claim 2 further comprising a surge vessel positioned between the gas compressor and the inlet into the first chamber and a gas flow control valve activated by gas pressure positioned between the surge vessel and the first chamber.

* * * * *